United States Patent

[11] 3,581,299

[72] Inventor Wilfred W. Schmit
  Port Washington, Wis.
[21] Appl. No. 777,040
[22] Filed Nov. 19, 1968
[45] Patented May 25, 1971
[73] Assignee Flo-Tronics, Inc.
  Minneapolis, Minn.

[54] ELECTRIC FENCE CHARGER HAVING GROUND DETECTOR
10 Claims, 3 Drawing Figs.

[52] U.S. Cl. ................................................ 340/254,
  256/10, 307/132
[51] Int. Cl. ....................................................G08b 21/00,
  H05c 1/04, A01b 3/00
[50] Field of Search .................................. 340/254,
  373, 255, 253 (M); 307/93, 94, 132; 317/18, 11;
  256/10

[56] References Cited
UNITED STATES PATENTS

| | | | |
|---|---|---|---|
| 396,582 | 1/1889 | Loomis ........................ | 340/255UX |
| 1,300,546 | 4/1919 | Armstrong ................... | 340/255 |
| 2,079,636 | 5/1937 | Sharp ........................... | 256/10UX |
| 2,127,898 | 8/1938 | Webster ....................... | 340/254UX |
| 2,304,954 | 12/1942 | Pfanstiehl ..................... | 340/254 |
| 2,343,300 | 3/1944 | Klumb .......................... | 307/132X |
| 2,401,815 | 6/1946 | Dalziel .......................... | 307/93 |
| 2,602,844 | 7/1952 | Schilling ....................... | 307/132 |
| 3,383,588 | 5/1968 | Stoll et al. .................... | 324/51 |
| 3,422,280 | 1/1969 | Olson ............................ | 340/254X |

Primary Examiner—John W. Caldwell
Assistant Examiner—Daniel Myer
Attorney—Dugger, Peterson, Johnson and Westman ABSTRACT: An electric fence charger that is energized from a utility power supply wherein one utility supply line is grounded, said charger having a circuit to provide, in respect to a separate ground connection of said charger, high voltage energy impulses of short duration and a ground detector circuit to provide a visual indication when the fence charger ground does in fact not adequately connect the charger to ground. The ground detector circuit includes a pair of resistors connected in series across the primary winding or a center tapped primary winding of a transformer forming a part of the charger and connected to the utility power supply, and indicating means, such as a neon light, connected between the adjacent ends of said resistors or center tap and the charger ground terminal.

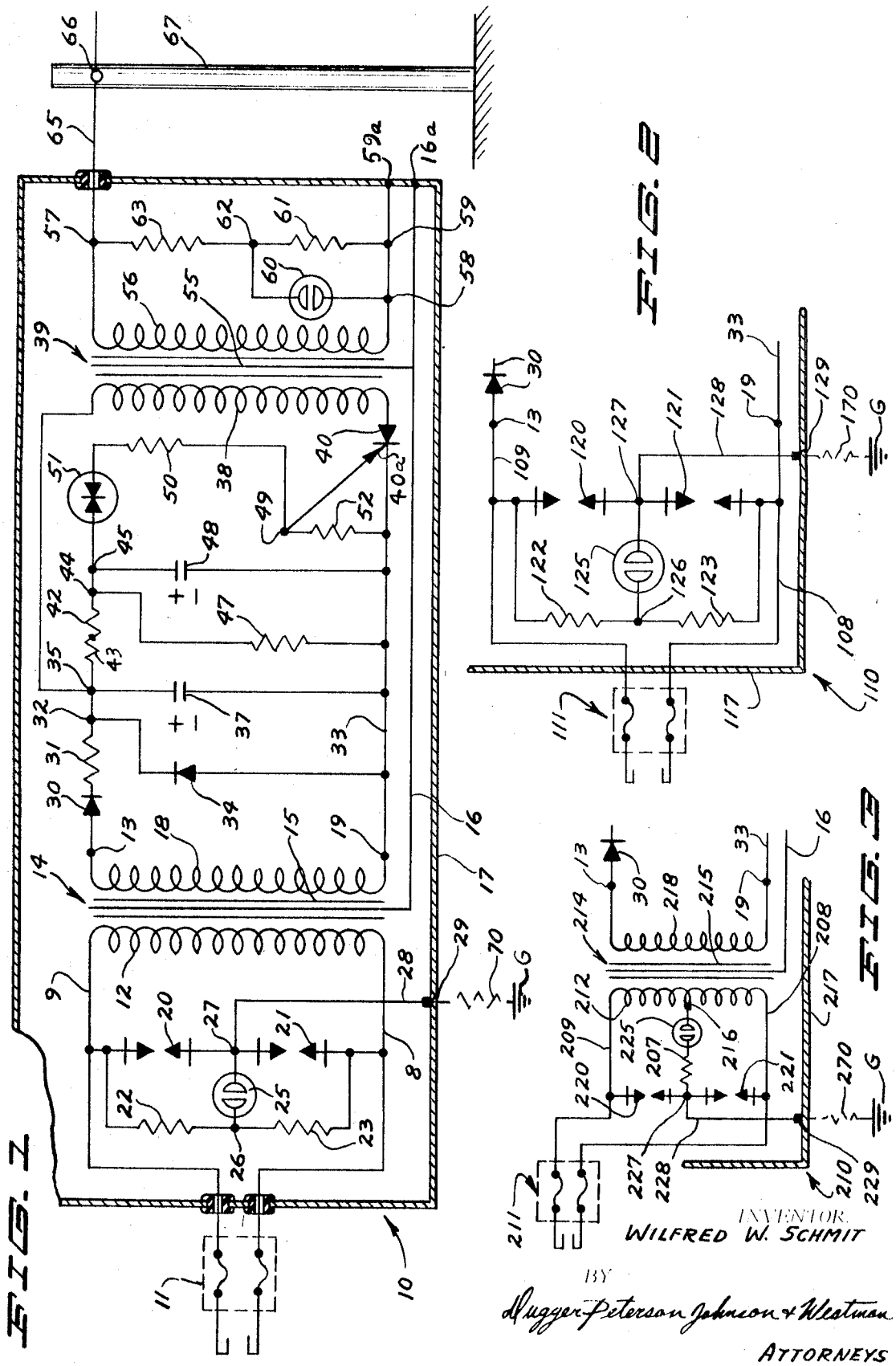

ELECTRIC FENCE CHARGER HAVING GROUND DETECTOR

BACKGROUND OF THE INVENTION

An electric fence charger energized from a utility supply circuit having one supply line grounded, and having a ground detector circuit to provide a visually observable indication that the "ground" terminal of the charger is not adequately connected to an earth ground.

Fence chargers normally provide a high-voltage terminal that is connected to an insulated fence wire, and a ground terminal that is connected to the charger housing and is, in service, connected to an earth ground such as a water pipe or grounding rod. When so connected, such fence chargers may not actually be adequately grounded and such inadequate ground is not apparent in use. If not properly ground, the chassis and/or housing may then assume a substantial voltage above ground and as a result the fence may not be adequately charged, and the fence charger chassis may give off an annoying shock if touched.

SUMMARY OF THE INVENTION

An electric fence charger of the type described having a pair of resistors connected in series across the input utility power supply lines at the primary winding of the charger and an indicator connected between said resistors and the ground terminal of the fence charger to give a visual indication when the fence charger is not adequately grounded.

BRIEF DESCRIPTION OF THE DRAWINGS

FIG. 1 is a diagrammatic representation of the first embodiment of the invention;

FIG. 2 is a fragmentary diagrammatic representation of part of the second embodiment of the invention; and FIG. 3 is a fragmentary diagrammatic representation of part of the third embodiment of the invention.

DESCRIPTION OF THE PREFERRED EMBODIMENT

Referring to FIG. 1, the first embodiment of the invention, generally designated 10, includes a fused input 11 that through lines 8 and 9 connects the primary winding 12 of the transformer, generally designated 14, to a public utility source of power, for example 110 volts, 60-cycle alternating current. The public utility power source always has one line grounded. The transformer 14 includes a core 15 that is electrically connected through line 16 to the fence charger housing or chassis 17 at 16a and a secondary winding 18 connected across junctions 13 and 19.

A line lightning arrester 20 is connected in parallel with the combination of a resistor 22 and a neon lamp 25, and a line lightning arrester 21 is connected in parallel with a combination of a resistor 23 and the above mentioned neon lamp 25, said resistors and lightning arresters being connected across the primary winding 12 of the input transformer 14. Each of the resistors 22, 23 may be 56 K ohms, one-half watt. The neon lamp 25 is connected across the common junction 26 for the resistors 22, 23 and the common junction 27 for the lightning arresters, junction 27 being electrically connected by a line 28 to a terminal 29 on the metal housing or chassis 17 of the fence charger. Thus resistors 22, 23 act as a voltage divider with the lamp 25 being connected across their common junction and the ground terminal 29.

A diode 30 and a resistor 31 (for example 500 ohms) are connected in series from junction 13 to junction 32, while junction 19 is connected to line 33. A diode 34 is connected from line 33 to a junction 32 which in turn is connected by a line to junction 35. A capacitor 37 (for example 100 mfd., 150 VDC) is connected from junction 35 to line 33. Also from junction 35 a line connects to the primary winding 38 of the transformer generally designated 39 and the circuit then continues through the silicon controlled rectifier 40, to line 33. That is, winding 38 and rectifier 40 are connected in series.

Rectifier 40 is a silicon controlled rectifier having its control electrode 40a connected by a line to junction 49.

Resistor 42 (for example 39 K—150 K ohm) and resistor 43 (for example 39 K ohm) are connected in series from junction 35 to junction 44 and junction 44 is connected directly to junction 45. A resistor 47 (for example 180 K ohm) is connected from junction 44 to line 33. Capacitor 48 (for example 50 mfd., 50 VDC) is connected from junction 45 to line 33. From junction 45 a circuit extends through a trigger diode 51 (for example sold under the trade designation Motorola MPT 28–32), and then through resistor 50 (for example 180 ohm) to junction 49. A resistor 52 (for example 180 ohm) is connected from junction 49 to line 33.

The transformer 39 includes a secondary winding 56 and a core 55 that is electrically connected to line 16, line 16 being connected to the housing which provides an electrical connection with the fence charger "ground" terminal 29. One end of winding 56 is connected to junction 57 while the opposite end is connected to a junction 58 that in turn is connected by a line to junction 59. A test lamp 60 is connected across junctions 58, 62 while a resistor 61 (for example 220 K ohm) is connected across junctions 62, 59. Junction 59 is also connected to the housing at 59a to provide an electrical connection to terminal 29. A resistor 63 (for example 220 K ohm) is connected across junctions 62, 57.

The fence wire 65 is connected to junction 57 which is usually an insulated terminal on the housing 17. The fence wire is supported on insulators 66 mounted by a plurality of posts 67 in a conventional manner, only one such post and insulator being illustrated.

In use, the terminal 29 is supposed to be solidly connected to a reliable "earth" ground, this ground connection being indicated by the dotted line resistor 70, which may have a very low value, if the "ground" is adequate, or may have a considerably value, of resistance if the ground is inadequate. In the event a good earth ground connection is made, the value of resistance will be negligible, i.e. very close to 0 ohms; however, if a poor ground connection is made or later on developes during use, the value of this resistance 70 may be somewhere between 0 ohm and a not inconsiderable ohmic value.

When the plug 11 is connected to a suitable source of power and the housing is adequately grounded at terminal 29, by a solid connection to an earth ground, the voltage across transformer secondary winding 18 (which may, for example, be approximately 150 volts) will be impressed on junctions 13 and 19. The positive voltage wave of each cycle, as pulses, are conducted through diode 30 and resistor 31 and junction 32 to the positive junction 35 of capacitor 37 which is connected via line 33 to junction 19 thereby building up the charge across said capacitor 37. As the charge builds across capacitor 37, its voltage rises and current flows increasingly through resistors 42 and 43 and junction 44 to junction 45 which is the positive side of capacitor 48 which is connected to line 33, thereby gradually increasing the charge across capacitor 48. As the voltage of capacitor 48 gradually increases to a value in the range of 28 volts to 32 volts, the trigger diode 51 will become conductive and the charge across capacitor 48 will be dissipated through resistors 50 and 52 to line 33. The potential drop across resistor 52 provides at junction 49 a control voltage pulse of 3 to 5 volts as the charge of capacitor 48 dissipates, and this voltage pulse causes the silicon control rectifier 40 to become conductive. When this occurs the charge on capacitor 37 quickly discharges through the primary 38 of transformer 39, which in turn through the secondary 56 provides an output high voltage pulse which is impressed upon junctions 57 and 59 and hence via junctions 59a and 16a between high voltage terminal 57 and ground terminal 29.

As the flux in the transformer 39 decays, it will produce a negative voltage in the primary 38 of transformer 39 and this negative voltage is applied to the positive side of capacitor 37 thereby charging it in the reverse direction. However, as soon as this negative pulse passes the negative charge on capacitor 37 will be discharged through the diode 34 thereby reestablishing a 0 or near 0 potential across the condenser 37 preparatory to again building up a charge across that condenser.

The resistor 47 is provided so as to prevent an excessive increase of voltage across the capacitor 48 in the event the trigger diode 51 should fail. If this should occur, the voltage at junction 45 which is applied to capacitor 48 would gradually rise to the level of the voltage across capacitor 37, which would be excessive for the capacitor 48. Such extensive rise in voltage is prevented by resistor 47.

Under normal conditions, when an adequate earth ground connection is made to the ground terminal 29, the full output voltage of transformer 39 which appears across junction 57 and terminal 29 will also be the voltage from 57 to ground G. If an inadequate earth ground connection is made to ground terminal 29, i.e. if connection 70 has a not inconsiderable resistance, when a fence load is connected to junction 57, a portion of the output voltage of transformer 39 will appear across resistance 70. Since junction 29 is connected by line 28 to junction 27 the voltage across connection 70, from terminal 29 to ground G will be impressed at 27 upon a terminal of neon lamp 25 which is connected through resistors 22 and 23 to lines 9 and 8 respectively, one of which lines is grounded through the public utility ground and this voltage will illuminate lamp 25. The neon lamp 25 will flash each time an output pulse is delivered across the fence charger output terminals 57 and 29, thus indicating an inadequate ground connection from 29 to G. If the lamp 25 does not flash, the charger is grounded adequately.

Although the invention has been described with reference to fence chargers having a transformer at 14, the invention is equally applicable when this transformer 14 is omitted. As may be seen from the description below relative the second embodiment of the invention, generally designated 110, the ground detector circuit can be utilized when only a single transformer is provided at 39 and transformer 14 is omitted. Thus, this second embodiment includes a fused pair of supply lines 111 connected to lines 108, 109 which connect directly to junctions 19 and 13 respectively of FIG. 1. Resistors 122, 123, lightning arresters 120, 121, neon lamp 125 junctions 126, 127, line 128, terminal 129 and housing 117 are connected together as described with reference to the respective corresponding members 8, 9, 22, 23, 20, 21, 25, 26, 27, 29 and 17 of the first mentioned embodiment shown in FIG. 1. Resistors 122, 123 act as a voltage divider, the lamp 125 being connected across the common junction between said resistors and the ground terminal.

The line 109 is connected to junction 13 while the line 108 is connected to the junction 19. Since the structure of the second embodiment to the right of junctions 13, 19 in FIG. 2 is the same as that described and illustrated with reference to the first embodiment that is to the right of junctions 13 and 19 in FIG. 1, the structure of the second embodiment will not be further described. However, it is to be mentioned in that as no transformer corresponding to transformer 14 is provided in the second embodiment, the sizes of capacitors and resistors used would be selected so as to be appropriate for the voltage supplied at 111.

Since the second embodiment of FIG. 2 differs from the first embodiment of FIG. 1 only by the omission of a transformer (transformer 14), it is believed that the construction of and the operation of the second embodiment will be apparent from the description already given relative the first embodiment. The first embodiment is preferred since the transformer 14 serves to isolate the line voltage supply of the power source from the fence charger housing, should there be an insulation failure, from the secondary of the winding connected to the fence wire.

The third embodiment of the invention generally designated 210 is the same as the first embodiment other than it has a center tapped input transformer generally designated 214 in place of transformer 14, and neon lamp 225 and resistor 207 connected in series across the junction 227 between the lightning arresters and the center tap 216 of transformer 214 in place of the resistors 22, 23 and the neon lamp being connected across junctions 26, 27. That is, in the third embodiment there is provided a fused input 211 that through lines 208, 209 connects the primary winding 212 of transformer 214 to a public utility source of power, winding 212 having center tap 216. Lightning arresters 220, 221 are connected together at junction 227, said arresters being connected in series across lines 208, 209. Junction 227 is connected through line 228 to a ground terminal 229 on the metal housing or chassis 217, resistor 270 representing the resistance of the connection of terminal 229 to the earth ground G.

Transformer 214 also includes a core 215 that through line 16 is ground to housing 217 and a secondary winding 218 connected across junctions 13, 19. Since the structure of embodiment 210 to the right of junctions 13, 19 as viewed in the drawings is the same as that to the right of said junctions in FIG. 1, it has not been illustrated nor will it be described.

The resistor 207 is a current limiting resistor of just a high enough value to prevent the lamp 225 igniting at line voltage of lines 208, 209. However, in use, when terminal 270 is not adequately connected to ground, a portion of the output voltage of transformer 39 will appear across resistance 270, and this voltage will illuminate lamp 225.

I claim:

1. Electric fence charging apparatus energizable from a pair of utility power supply lines having a relatively low voltage therebetween, one of which is grounded, said apparatus comprising a high voltage terminal adapted to be connected to an insulated fence wire, a ground terminal adapted to be solidly connected to an external earth ground, a pair of input power supply lines adapted to be connected to said relatively low voltage utility power supply lines, first means connected to said input lines and said high voltage and ground terminals for periodically impressing a relatively high voltage across said high voltage terminal and ground terminal, said first means including second means connected across the input lines for acting as a voltage divider for the relatively low input power supply voltage, said second means having a junction intermediate the input lines, and third means connected from said junction to said ground terminal for furnishing a higher voltage signal between said ground terminal and said junction when the ground terminal is inadequately connected to an earth ground due to a sufficient increase in resistance resulting from the inadequate connection to earth ground.

2. The apparatus of claim 1 further characterized in that said second means comprises a transformer primary winding having said junction and that said junction comprises a center tap on said winding.

3. The apparatus of claim 2 further characterized in that said third means comprises a neon lamp and a resistor connected in series across said center tap and said ground terminal.

4. The apparatus of claim 1 further characterized in that said second means comprises a first resistor connected across the said junction and one of the input lines and a second resistor connected across said junction and the other of said input lines.

5. Electric fence charging apparatus energizable from a relatively low voltage grounded power source comprising a first and a second line adapted for connection to the relatively low voltage power source, a ground terminal adapted for connection to an earth ground, a secondary winding having one end adapted for connection to an electric fence and an opposite end electrically connected to said ground terminal to provide a relatively high voltage therebetween, first means connected across said lines for being charged from power provided in said lines and discharging to produce an energy impulse in said secondary winding to provide said relatively high voltage, said first means including a primary winding coupled to said secondary winding for transmitting an energy pulse to the secondary winding, charging means connected across said primary winding for storing energy and alternately discharging through said primary winding to provide an energy impulse in said primary winding, and detector means connected between both of said lines and to said terminal for providing a visual indication derived from said relatively high voltage when the terminal is inadequately connected to an earth ground.

6. The apparatus of claim 5 further characterized in that said detector means includes a first and a second resistor connected together in series across said first and second lines and a neon light connected across the connection between said resistors and said terminal.

7. Electric fence charging apparatus energizable from a relatively low voltage grounded power source comprising a first and a second line adapted for connection to the relatively low voltage power source, a ground terminal adapted for connection to an earth ground, a secondary winding having one end adapted for connection to an electric fence and an opposite end electrically connected to said ground terminal to provide a relatively high voltage therebetween, first means connected across said lines for being charged from power provided in said lines and discharging to produce an energy impulse in said secondary winding to provide said relatively high voltage, said first means including a primary winding connected across said lines and having a center tap and detector means connected across said center tap and said terminal for providing a visual indication derived from said relatively high voltage when the terminal is inadequately connected to an earth ground, said detector means comprising a current limiting resistor and a neon lamp connected in series.

8. Electric fence charging apparatus comprising a pair of input lines for connection to a pair of utility power supply lines having a relatively low voltage therebetween, one of which power lines is earth grounded, means in circuit with said pair of input lines for increasing said relatively low voltage to a relatively high voltage, first and second members connected to said voltage increasing means so that said relatively high voltage appears therebetween to allow said first member to be connected to an insulated fence wire and said second member to be connected to earth ground to thereby normally apply said relatively high voltage between said fence wire and earth ground, and means connected between said second member and the input line that is connected to the earth grounded power line, said last-mentioned means including a voltage responsive indicating element in series with said second member and said earth grounded input line, whereby a sufficient increase in resistance caused by a poor electrical connection between said second member and earth ground will increase the voltage potential between said second member and earth ground so as to increase the voltage across said voltage responsive element and thereby divert sufficient current through said indicating element to render said indicating element effectual.

9. The apparatus of claim 8 in which said indicating element is a neon lamp.

10. The apparatus of claim 9 including a resistor in series with said neon lamp.